United States Patent [19]

Schulz et al.

[11] 4,305,626

[45] Dec. 15, 1981

[54] TEXTILE ROLLERS

[75] Inventors: Norbert Schulz, Aschaffenburg; Karl Ostertag, Erlenbach, both of Fed. Rep. of Germany; Hans-Dieter Kayser, Sao Paulo, Brazil

[73] Assignee: Akzona Incorporated, Asheville, N.C.

[21] Appl. No.: 124,884

[22] Filed: Feb. 26, 1980

[30] Foreign Application Priority Data

Feb. 27, 1979 [DE] Fed. Rep. of Germany ... 7905441[U]

[51] Int. Cl.³ .............................................. F16C 32/06
[52] U.S. Cl. .......................................... 308/9; 308/20; 308/DIG. 1
[58] Field of Search ..................... 308/9, 20, DIG. 1

[56] References Cited

U.S. PATENT DOCUMENTS

| 3,063,041 | 11/1962 | Quade et al. | 308/9 |
| 3,203,260 | 8/1965 | Pierry et al. | 308/DIG. 1 |
| 4,013,326 | 3/1977 | King | 308/9 |
| 4,053,277 | 10/1977 | Bos et al. | 308/9 |

FOREIGN PATENT DOCUMENTS

| 2316967 | 10/1974 | Fed. Rep. of Germany | 308/20 |
| 1230989 | 5/1971 | United Kingdom | 308/9 |

Primary Examiner—Richard R. Stearns
Attorney, Agent, or Firm—Francis W. Young; Tom R. Vestal

[57] ABSTRACT

An aerodynamically supported roller bearing is disclosed, having means for connecting a compressed gas supply and using the compressed gas to bring the roller up to a desired speed. The design of the roller then permits the compressed gas supply to be reduced or turned off while the roller continues to be aerodynamically supported. Advantageously, some minimal compressed gas is continued through the roller to purge the roller of potential dust particles interfering with the operation of the roller.

6 Claims, 5 Drawing Figures

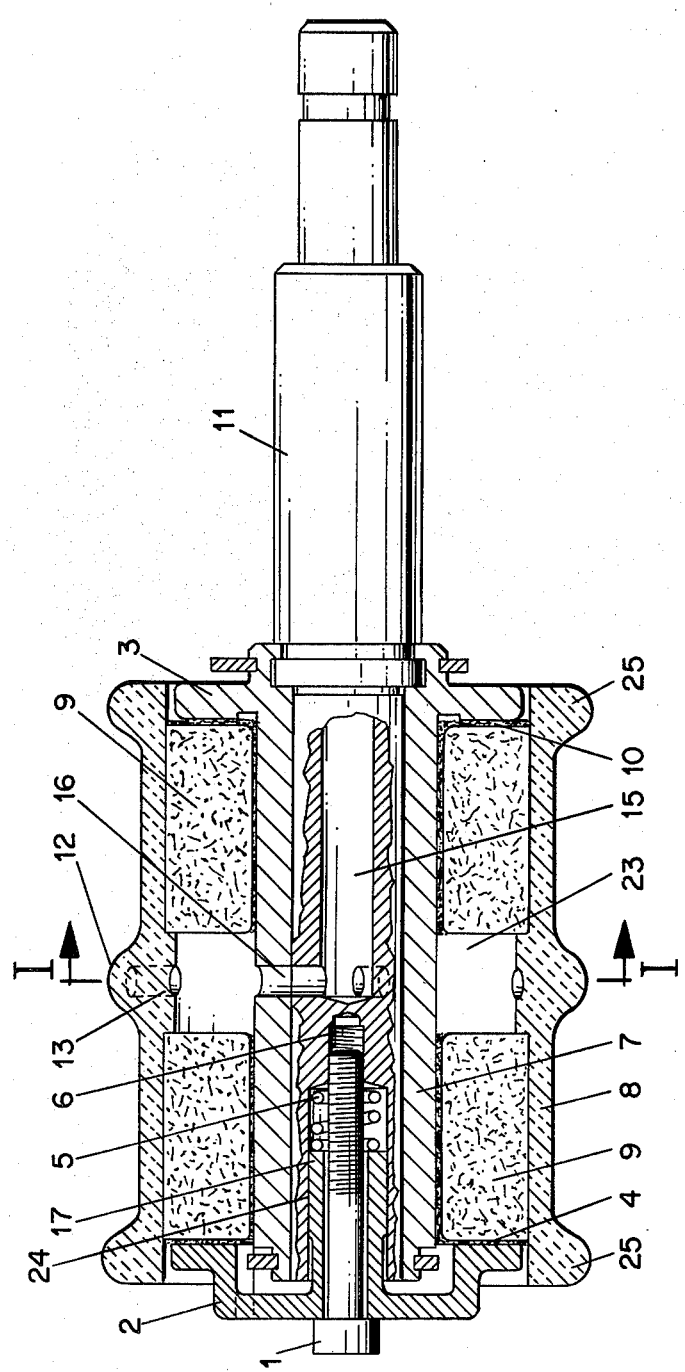
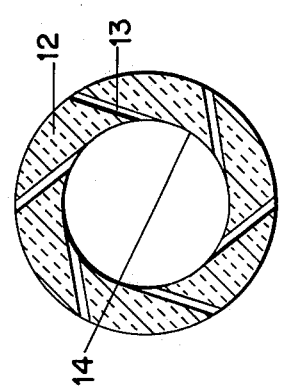
FIG. 1
FIG. 2

TEXTILE ROLLERS

BACKGROUND OF THE INVENTION

Yarn-driven idle or deflecting rollers are widely known in the synthetic fiber and textile industry. To treat this yarn as gently as possible, every attempt is made to reduce the driving force as low as possible. As the driving force is mainly necessitated because of friction, many attempts to reduce the driving force involves friction reducing devices for the rollers.

Air-cushioned designs have been especially suitable for this application because of the low friction performance characteristics of this type bearing. In particular, so-called aerodynamic bearing designs are suitable because of their ability to aspirate the air required for the formation of the "lubricating" film in operation.

A substantial drawback of the air bearing design, however, is the instability of the bearing during the starting phase of operation—i.e., from zero or low rotation to nominal rotational speed. Normally, contact between bearing elements is accepted during start-ups, and problems inherent therewith are overcome by selecting materials of construction having appropriate "self-lubricating" or friction minimizing properties. Even this technique, however, involves some frictional restraint during the start-up phase.

In manipulation of textile yarns, especially small denier yarns, the start-up phase is critical, as uneven and/or high tensions may break the yarn or cause it to wrap around the processing equipment. Aerostatic bearing designs—where high pressure air is continuously supplied—avoid the frictional problems during start-up, but use an unacceptable amount of energy and, therefore, cost.

An air-cushioned, aerodynamic idle roll which is started at high air pressure, and for which air at reduced pressure is used in the steady state condition, is known. See, for example, U.S. Pat. No. 3,746,233. FIG. 4 of that reference depicts two compressed air lines from a compressed air source to the idle roll. Each line has a pressure-reducing valve, one valve being adjusted to the pressure required during the initial start-up or acceleration phase of the roller, and the other line being adjusted for normal running conditions. Means for directing either of the two lines to the aerodynamic idle roll are also shown.

BRIEF DESCRIPTION OF THE INVENTION

The bearing of the present invention, when manufactured of materials of a low coefficient of friction, can be operated as a conventional aerodynamic bearing without compressed air supply. However, the preferred operation of the roller herein is as follows:

The roller is started with compressed air of about 2.0 to 4.0 bar. Air outflow openings starting tangentially at the inner jacket area act as an air turbine to bring the roller body, through adjustment of the air pressure, to the specific rpm needed in the textile operation. When the desired rotary speed is obtained, the pressure is reduced to a level just sufficient to prevent contaminated ambient air from being aspirated.

BRIEF DESCRIPTION OF THE DRAWINGS

FIG. 1 is a longitudinal cross section through the idle roller of the invention;

FIG. 2 is a section perpendicular to the rotation axis of the idle roller along I—I;

DETAILED DESCRIPTION OF THE INVENTION

Figure 3:
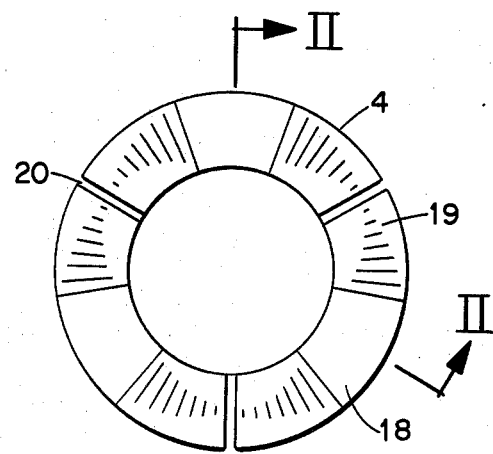
FIG. 3 is a plane view of the axial bearings of the idle roller.

Referring to the roller design of FIG. 1, a stationary pivot journal 11 is attachable through conventional means not shown to a textile processing machine. An axial bore 15 is connectable to a compressed air supply on the textile machine. One or more radial bores 16 is extended from axial bore 15 through stationary pivot journal 11 and bearing sleeve 7 into chamber 23 between bearing bodies 9.

At the opposite end of pivot journal 11 from the axial bore 15 is a likewise axial pocket bore 24 ending in a tapped hole 6. Hollow journal 17 of bearing cover 2 is situated in this bore, and its position is adjusted by means of screw 1 against pressure spring 5.

In the illustrated version, bearing sleeve 7 is firmly fitted on bearing journal 11 by, e.g., pressure fit. Bearing sleeve 7 has a collar 3 at the air inflow end which, together with bearing cover 2, insures the axial position of roller body 8 with bearing bodies 9. The roller body 8, on which textile yarns travel, has a circular rim bead 25 on each end, and a thick circular section or bead 12 in the center. As shown in FIG. 2, six air outflow bores 13 are aligned from the inner jacket surface area 14 tangentially outward in the area of circular bead 12 in a uniformly distributed manner.

Figure 4:
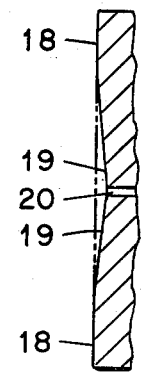
FIG. 4 is a section view along II—II in FIG. 3.
Figure 5:
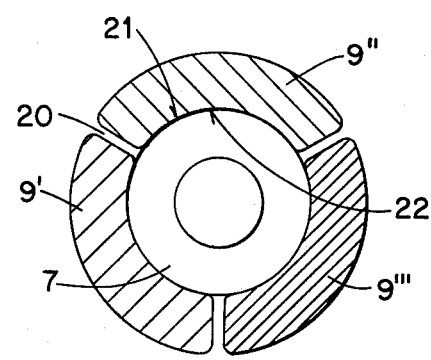
FIG. 5 is a section through a bearing body.

The design of the bearing bodies 9 at their faces 4 is illustrated in FIGS. 3, 4 and 5. The bearing bodies 9 are shown in FIG. 5 in three segments. The faces 4 are milled or ground at a slight angle 19 in the area of the narrow slots 20 between the bearing segments 9', 9" and 9''', and are only parallel to the inner surfaces of core 2 and collar 3 in the center area 18 between the two milled segments of the surface.

The inner bearing surface 21 on bearing sleeve 7 has a radius of curvature of 1% to 5%, preferably about 2%, smaller than the radius of curvature of counter face 22 on bearing sleeve 7. The milling and the differential radii just described insure stabilization of the bearing performance during the latter's performance as an aerodynamic bearing.

While other embodiments may become apparent to those skilled in the art, the invention herein is set forth in the following claims:

What is claimed is:

1. An aerodynamically supported roller, comprising:
   (a) a stationary pivot journal having a first axial bore extending from one end thereof, said first axial bore having means for connecting a compressed gas source thereto;
   (b) an outer roller body, substantially cylindrical in shape and having a circular bead on its outer surface;
   (c) bearing means between said stationary pivot and said outer roller body and positioned at each end of the roller body, said bearing means forming a chamber between said stationary pivot and said outer roller body;
   (d) means for maintaining said outer roller body in axial alignment with said stationary pivot; and (e) said stationary pivot further having a radial bore extending from said axial bore into said chamber, and said outer roller body having at least two bores symmetrically extending tangentially from the inner surface of said roller body adjacent said chamber through said circular bead and in a plane perpendicular to the roller axis.

2. The roller of claim 1, wherein said means for maintaining said outer roller body in axial alignment with said stationary pivot include a bearing sleeve affixed to the outer surface of said stationary pivot, said bearing sleeve having an end collar on the sleeve end over said first axial bore; a second axial bore opposite said first axial bore and having a threaded inner section and greater outer bore section; a bearing cover, said cover having an axially positioned cylindrical hollow journal slidably fitted into the greater diameter outer bore section of said second axial bore, and a bearing cover collar adjacent to the outer bearing means; a pressure spring in said greater diameter outer bore section pressing outward on said bearing cover; and a bolt threaded through said hollow journal and into said threaded inner section of said second bore, said screw pressing inward on said bearing cover.

3. The roller of claim 1 or 2, having an even number of symmetrically extending tangential bores between 4 and 8.

4. The roller of claim 2, wherein the bearing means comprise three bearing segments positioned at each end of the outer roller body, the abutting end sections of each segment being shaped at a slight angle to the center section of the segment, the bearing segment sections forming, with the end collar on said bearing sleeve and said bearing cover collar, multiglide axial bearing surfaces.

5. The roller of claim 4, wherein the inner bearing surface radius of curvature of said bearing segments adjacent said bearing sleeve is from 1% to 5% smaller than the radius of curvature of the outer surface of said bearing sleeve.

6. The roller of claim 1, wherein the outer roller body is constructed of ceramic material.

* * * * *